United States Patent
Liu et al.

(10) Patent No.: US 10,693,963 B2
(45) Date of Patent: **\*Jun. 23, 2020**

(54) ON-DEMAND WORKLOAD MANAGEMENT IN CLOUD BURSTING

(71) Applicant: International Business Machines Corporation, Armonk, NY (US)

(72) Inventors: Kai Liu, Beijing (CN); Kewei Sun, Beijing (CN); Di Xu, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,910

(22) Filed: Sep. 12, 2018

(65) Prior Publication Data
US 2019/0014178 A1    Jan. 10, 2019

Related U.S. Application Data

(63) Continuation of application No. 14/923,539, filed on Oct. 27, 2015, now Pat. No. 10,122,793.

(51) Int. Cl.
*H04L 29/08* (2006.01)
(52) U.S. Cl.
CPC ...... *H04L 67/1097* (2013.01); *H04L 67/1029* (2013.01)
(58) Field of Classification Search
CPC .................. H04L 67/1097; H04L 67/1029
See application file for complete search history.

(56) References Cited

U.S. PATENT DOCUMENTS

| 8,606,924 B2 | 12/2013 | Gujral et al. |
| 9,705,965 B2 | 7/2017 | Zhang et al. |

(Continued)

FOREIGN PATENT DOCUMENTS

WO    2013149339    10/2013

OTHER PUBLICATIONS

Ardagna, D., et al. "Dual Time-Scale Distributed Capacity Allocation and Load Redirect Algorithms for Cloud Systems", Journal of Parallel and Distributed Computing, Feb. 21, 2012, pp. 796-808.

(Continued)

*Primary Examiner* — Viet D Vu
(74) *Attorney, Agent, or Firm* — Fleit Intellectual Property Law; Jon Gibbons

(57) ABSTRACT

A system, computer program product, and method is described to manage cloud bursting from a private cloud to a public cloud. The method starts with executing one or more software components of at least one application receiving transaction requests on at least one processing node accessing at least one database server. The one processing node is managed by at least one controller in a first deployment model of a computing infrastructure. The controller, the processing nodes and the database servers each include instrumentation for tracking of performance metrics thereof. A map is created of transaction requests received by the controller to data resources in the database by analyzing the set of common structures. The map is used to identify which of the software components and corresponding data resources in the database to move a processing node in a second deployment model of a computing infrastructure.

20 Claims, 13 Drawing Sheets

(56) References Cited

U.S. PATENT DOCUMENTS

| | | | |
|---|---|---|---|
| 2005/0055694 A1* | 3/2005 | Lee | G06F 9/4881 |
| | | | 718/100 |
| 2011/0029498 A1* | 2/2011 | Ferguson | G06F 16/2343 |
| | | | 707/703 |
| 2011/0137805 A1 | 6/2011 | Brookbanks et al. | |
| 2012/0204187 A1 | 8/2012 | Breiter et al. | |
| 2012/0222041 A1 | 8/2012 | Sabin et al. | |
| 2012/0297238 A1* | 11/2012 | Watson | G06F 9/5088 |
| | | | 714/4.11 |
| 2013/0061220 A1 | 3/2013 | Gnanasambandam et al. | |
| 2014/0007097 A1 | 1/2014 | Chin et al. | |
| 2014/0019415 A1* | 1/2014 | Barker | G06F 16/214 |
| | | | 707/643 |
| 2014/0040884 A1 | 2/2014 | Donahue | |
| 2015/0215229 A1 | 7/2015 | Zu et al. | |
| 2016/0179840 A1* | 6/2016 | Dani | G06F 16/24561 |
| | | | 707/824 |
| 2017/0093669 A1 | 3/2017 | Nortman | |

OTHER PUBLICATIONS

Mattess, M., et al. "Cloud Bursting: Managing Peak Loads by Leasing Public Cloud Services", Cloud Computing: Methodology, Systems, and Applications, Oct. 2011, CRC Press, Boca Raton pp. 1-28.

Guo, T., et al. "Seagull: Intelligent Cloud Bursting for Enterprise Applications", Aug. 17, 2013, pp. 1-6.

Non-Final Office Action for U.S. Appl. No. 14/923,539 dated Feb. 9, 2018.

List of IBM Patents or Patent Applications Treated As Related.

* cited by examiner

500

```
{
  "component": "proxy",
  "events": [
    {
      "type": "inbound ",
      "timestamp": " ",
      "token": "token A",
      "caller": "client1",
      "threadid": 2467,
      "action": "get",
      "tras.": "item"
    },
    {
      "type": "outbound",
      "timestamp": " ",
      "token": "token A",
      "callee": "was1",
      "threadid": 2467
    },
    {
      "type": "inbound",
      "timestamp": " ",
      "token": "token A",
      "caller": "was1",
      "threadid": 2467
    },
    {
      "type": " outbound ",
      "timestamp": " ",
      "token": "token A",
      "callee": "client1"
      "threadid": 2467
    }
  ]
}
```

```
{
  "component": "was1",
  "events": [
    {
      "type": "inbound",
      "timestamp": "",
      "token": "token A",
      "caller": "proxy",
      "threadid": 53313
    },
    {
      "type": "outbound",
      "timestamp": "",
      "token": "token A",
      "callee": "db",
      "threadid": 53313
    },
    {
      "type": "inbound",
      "timestamp": "",
      "token": "token A",
      "caller": "db",
      "threadid": 53313
    },
    {
      "type": "outbound",
      "timestamp": "",
      "token": "token A",
      "callee": "proxy",
      "threadid": 53313
    }
  ]
}
```

```
{
  "component": "db",
  "events": [
    {
      "type": "inbound",
      "timestamp": "",
      "token": "token A",
      "caller": "was1",
      "threadid": 18764
    },
    {
      "type": "sql",
      "timestamp": "",
      "target": "T_ITEMS",
      "action": "select' "
      "threadid": 18764
    },
    {
      "type": "outbound ",
      "timestamp": "",
      "token": "token A",
      " callee ": "was1",
      "threadid": 18764
    }
  ]
}
```

FIG. 5

ON-DEMAND WORKLOAD MANAGEMENT IN CLOUD BURSTING

CROSS-REFERENCE TO RELATED APPLICATIONS

This application is related to, and claims priority from, U.S. Pat. No. 10,133,793 entitled "ON-DEMAND WORKLOAD MANAGEMENT IN CLOUD BURSTING", filed on Oct. 27, 2015, the disclosure of which is hereby incorporated by reference in its entirety.

BACKGROUND

The present invention generally relates to cloud computing, and more specifically to resource sharing between different cloud types.

The increasing instrumentation of physical and computing processes has given us unprecedented capabilities to collect massive volumes of time-series data. Examples of mass volumes of data being collected are data center management, environmental monitoring, financial engineering, scientific experiments, and mobile asset tracking.

SUMMARY

Disclosed is a novel system, computer program product, and method to manage cloud bursting from a first deployment model of a computing infrastructure, such as a private cloud, to a second deployment model of a computing infrastructure, such as a public cloud. The method starts with executing one or more software components of at least one application receiving transaction requests on at least one processing node accessing at least one file server with persistent data. An example processing node is an application server or web server. The one processing node is managed by at least one controller in a first deployment model of a computing infrastructure. The controller, the processing node and the file server each include instrumentation for tracking of performance metrics thereof. The performance metrics are parsed into a set of common structures for analysis. A map is created of transaction requests received by the controller to data resources in the file server by analyzing the set of common structures. The map is used to identify which of the software components and corresponding data resources in the file server to move a processing node in a second deployment model of a computing infrastructure. A load balancer configuration is updated to redirect new transaction requests to the processing node in the second deployment model of the computing infrastructure.

In one example, the transaction requests are tracked using tokens and the file server is a database server, each of the tokens include a user identifier of the user, a thread identifier for the thread handling the transaction request, a timestamp of the transaction request, and name of a database table in the database server. The map may include a type of a transaction request, a frequency of the type of the transaction request during a time period, and a response time to fulfill the transaction request for the type of transaction.

In a further example, the map includes a settable weighting factor associated with each type of the transaction request. The map is used to identify software components with lower frequency of the type of transaction request during the time period.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 5 is a diagram illustrating the detailed instrumentation of FIG. 4 being put into a structure to permit analysis;

DETAILED DESCRIPTION

Figure 1:
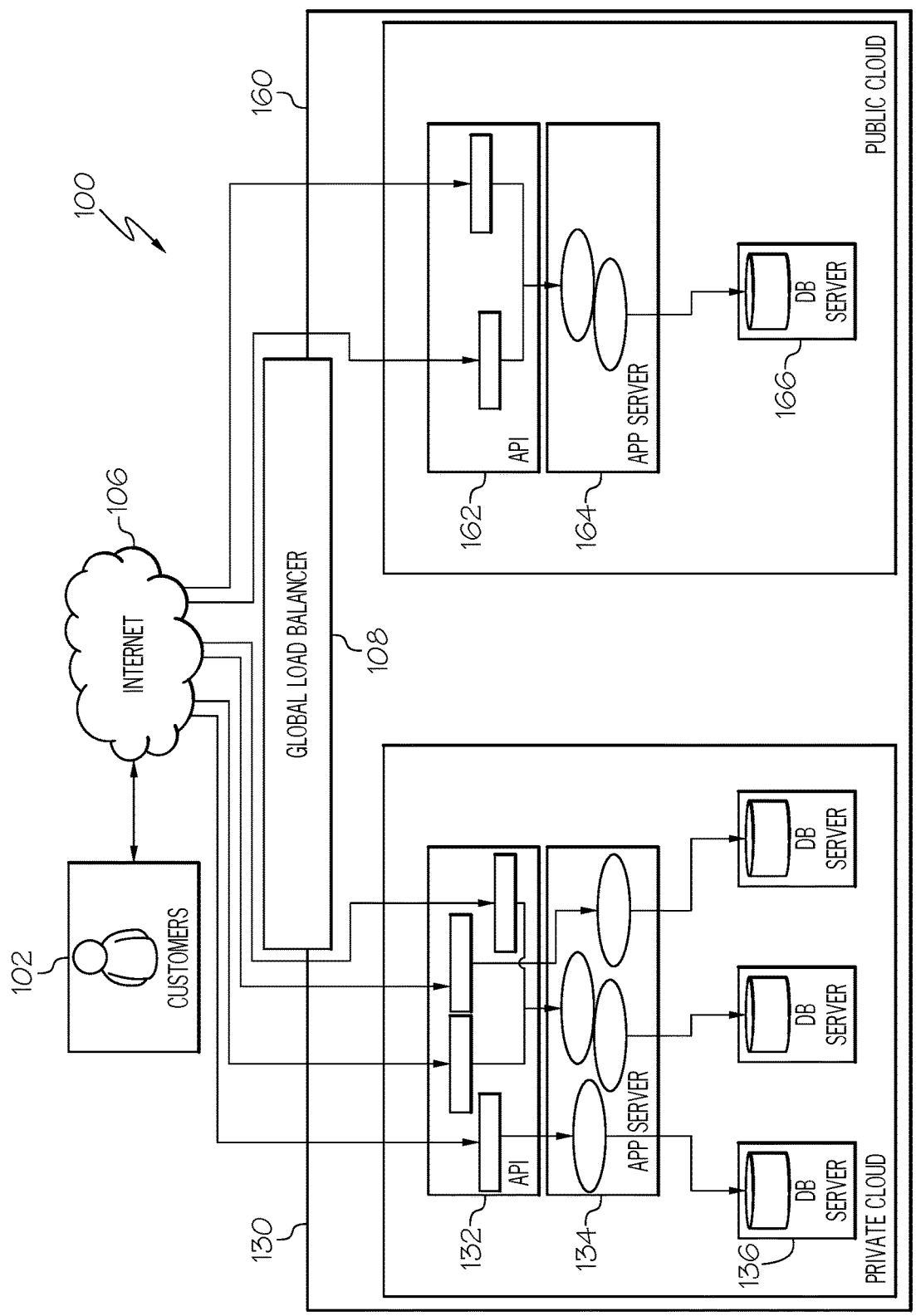
FIG. 1 is a block diagram illustrating one example of an operating environment of a first and second deployment model of a computing infrastructure/cloud environment.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The presently claimed invention relates to management of applications in different deployment models of a cloud infrastructure. Cloud bursting is an application deployment model in which an application runs in a private cloud or data center and bursts into a public cloud when the demand for computing capacity spikes. By leveraging this kind of technology, cloud consumers could reduce their overall cost sharply. There are challenges in bridging the inconsistencies among multiple cloud deployment models, as well as security, latency, and costs issues related to communicating between different types of cloud deployment models. Further, because of the complexity of applications, especially, for the replication/migration of all application data, the speed of cloud bursting is very slow and cannot fit most business scenarios.

The inventors have invented an efficient system and related apparatus to enable on demand workload management across clouds, so that the process of cloud bursting could be sped up sharply to cope with the workload bursts.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "cloud bursting" is used to mean an application deployment model in which an application runs in a private cloud or data center and bursts into a public cloud when the demand for computing capacity spikes.

The term "computing environment" is used to mean a computing environment where applications, platforms, and infrastructure can be shared across many different users. One example of a computing environment is a cloud computing environment including private, public, and hybrid clouds. Service models for the computing environment include Infrastructure as a Service (IaaS), Platform as a Service (PaaS), and Software as a Service (SaaS).

The term "deployment models" is used to mean resources of a cloud computing environment including private cloud, community cloud, public cloud, and hybrid cloud. In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

The term "instrumentation" refers code tracing and creation of performance metrics of software components as part of an application. In programming, instrumentation typically includes code tracing to receiving informative messages about the execution of an application at run time and performance counters that allow the tracking of the performance of the application. The focus of instrumentation in the present invention is on application topology information as opposed to performance monitoring and performance metrics, such as response time, CPU utilization. In the present invention use of instrumentation is not only related to request to which database on which node, but also to which table in the database. This is referred to as "enhanced transaction tracing analytics" which is marked 252 in FIG. 2. This is in charge of generating and updating "the transaction-data mapping table" 250 which is maintained in cloud bursting controller 208. The analytics process is described in FIG. 3, FIG. 4, FIG. 5, and FIG. 6.

Operating Environment

FIG. 1 shows one example of an operating environment 100 for managing workload. provisioning resources in a cloud computing environment. It should be noted that although the following discussion is directed to a cloud computing environment various embodiment are not limited to such environment and are application to non-cloud computing environments as well. In particular, FIG. 1 shows one or more customer/user systems 102 communicatively coupled to one or more cloud computing environments 130, 160 via a public network 106 such as the Internet. The user systems 102 can include, for example, information processing systems such as desktop computers, laptop computers, servers, wireless devices (e.g., mobile phones, tablets, personal digital assistants, etc.), and the like.

The user systems 102 access the cloud computing environment 130, 160 via one or more interfaces (not shown) such as a web browser, application, etc. to utilize resources provided by the cloud computing environments 130, 160. For example, FIG. 1 in each of the cloud computing environments/computing infrastructure 130, 160 shows a plurality of resources such as applications programming interfaces (API) 132, 162 communicating to processing node/app server 134, 164 accessing data resources in databases 136, 166. In this example, the deployment model of the cloud computing environment/computing infrastructure 130, 160 is a private cloud 130 and a public cloud 160 respectively. Other computing resources in the computing infrastructure 130, 160 include but are not limited to, processing, storage, networking, and other fundamental computing resources. In one example, the processing node/app server 134,164 are provided by and/or are hosted on a plurality of physical information processing systems and/or a plurality of virtual machines being executed by physical systems. A plurality of physical systems, virtual machines, or a combination thereof grouped together for providing a resource(s) is referred to as a "cluster".

In one example, the customer/user (via a user system 102) utilizes the cloud environment 130 to deploy a multi-tier web application. In this example, a multi-tier web application is an application (software designed to enable a user to perform a given task) accessible over a network whose presentation, logic (application processing), and data storage processes are performed at physically separate tiers, 132, 134, 136. For example, the presentation processes can be performed on a web server/API tier 132; the application processing can be performed on an application server tier 134; and the data storage processes can be performed on a file server with persistent data, in this example a database server tier 136. Each of the web server, application server, and database server tiers can be comprised of one or more of the information processing systems, processing nodes and/or VMs in the computing infrastructure 130.

Cloud Bursting Controller Architecture

Figure 2:
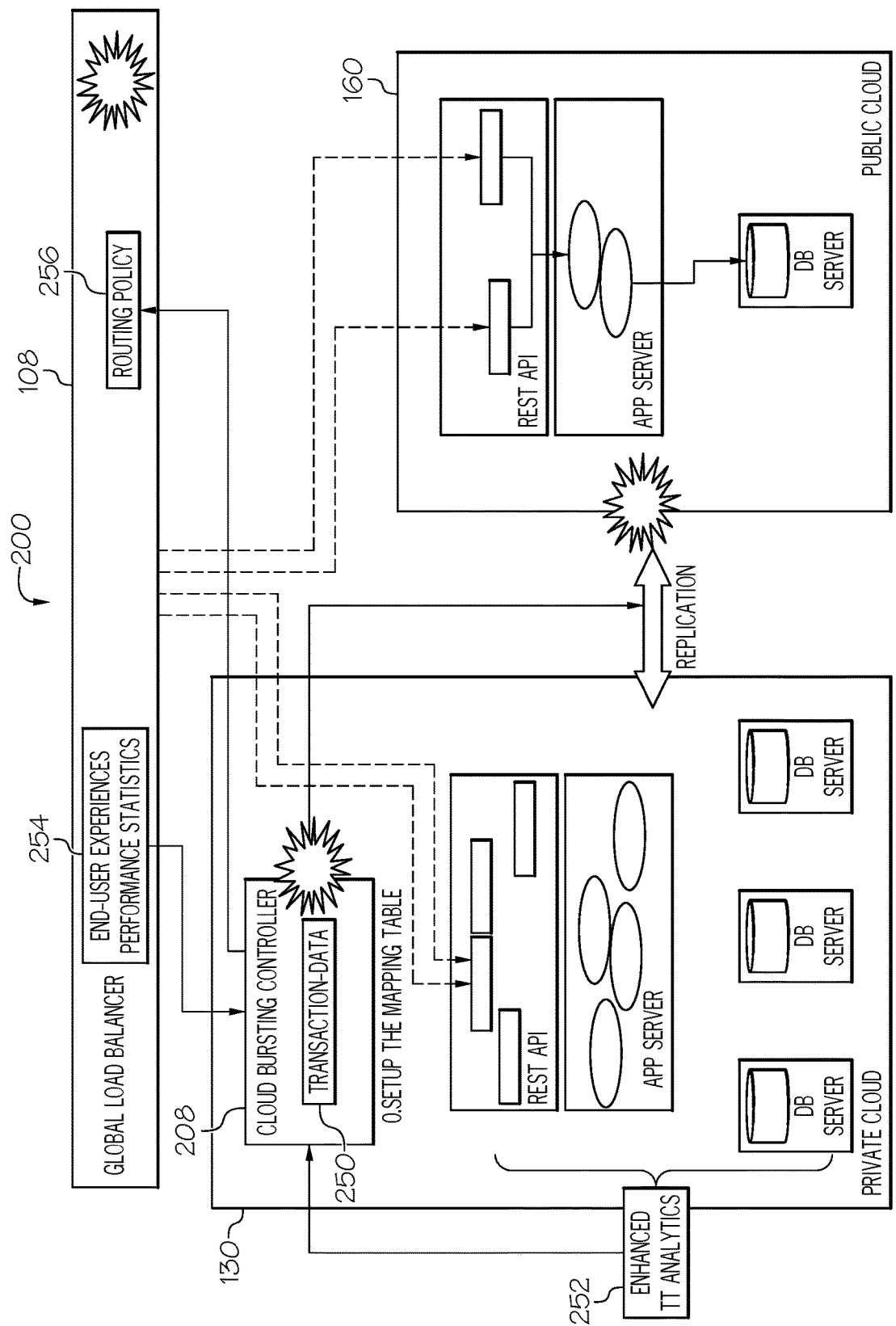
FIG. 2 is a block diagram illustrating one example of a cloud bursting controller architecture in accordance with FIG. 1.

FIG. 2 is a block diagram 200 illustrating one example of a cloud bursting controller architecture in accordance with FIG. 1. All of the elements have been previously described in FIG. 1 except the cloud bursting controller 208. In this example, the cloud bursting controller 208 is used to manage or "burst" traffic from the first deployment model of a computing infrastructure 130 and a second deployment model of a computing infrastructure 160. The major responsibility of the cloud bursting controller 208 is to decide when and which part of code and data need to be migrated to public cloud, according to transaction-data mapping table 250 and end-user experience performance statistics 254. After migration (deployment in the public/second environment), cloud bursting controller 208 will change the routing policy of global load balancer to redirect part of new coming requests to the new deployed environment. The details are described in FIG. 10.

Also shown is the instrumentation data that is collected. Specially, the instrumentation includes any routing polices 256 as part of the global load balancer 108, customer/user performance statistics 254, and analytics from the processing node/application server 132 and from the file server with persistent data 136. The instrumentation data includes code tracing and performance metrics which is further described below with reference to FIG. 3

Instrumentation Data of Requests to Data Resources

Figure 3:
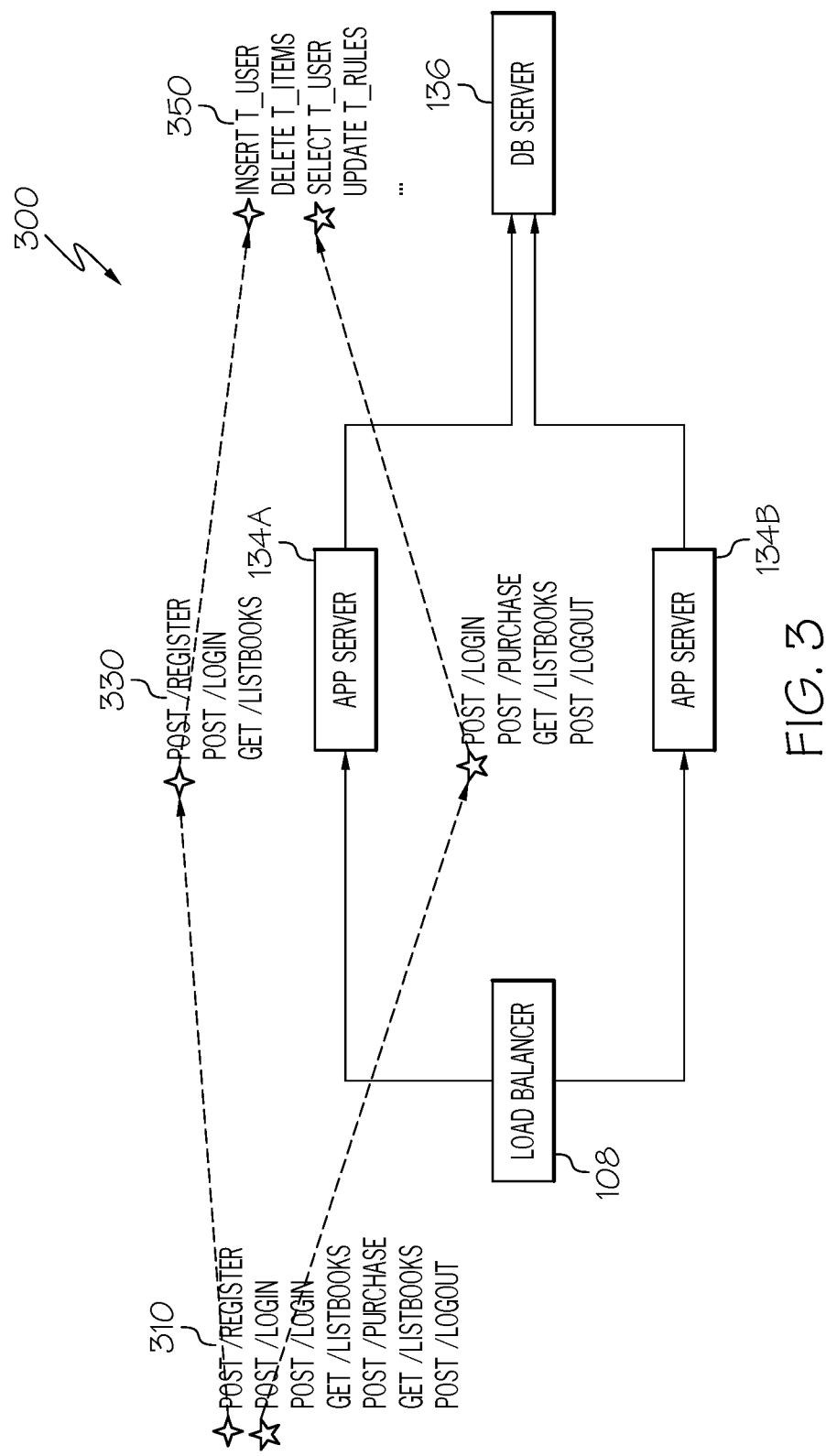
FIG. 3 is a diagram illustrating one example of instrumentation of requests to data resources.

FIG. 3 is a functional diagram 300 illustrating one example of an instrumentation of requests to data resources. In this example, hyper-text-transfer protocol (HTTP) methods, also known as verbs (e.g. GET, POST, PUT, DELETE) are shown 310 being received by the load balancer 108. These requests are assigned by the load balancer 108 to an application server/processing nodes 134(A), 134(B). In turn, these methods 330 are handled by applications running at each of the processing node 134 and converted into data resource actions 350 to the database server 136. There are one processing node 134(A), 134(B) in this example, however any number of processing nodes can be used. Also, more than one file server with persistent data or database server 136 can be used. Note that the load balancer 108 in this example has assigned the post/register request 310 to server 134(A) and the post/login request 310 to the server 134(B). The instrumentation information in an example token format is shown below:

and a data resource, such a table name of in the database 136, and type e.g. inbound and outbound with source/destination. The instrumentation information 400 is shown in further detail in FIG. 4 which is typically put into a log file.

Figure 4:
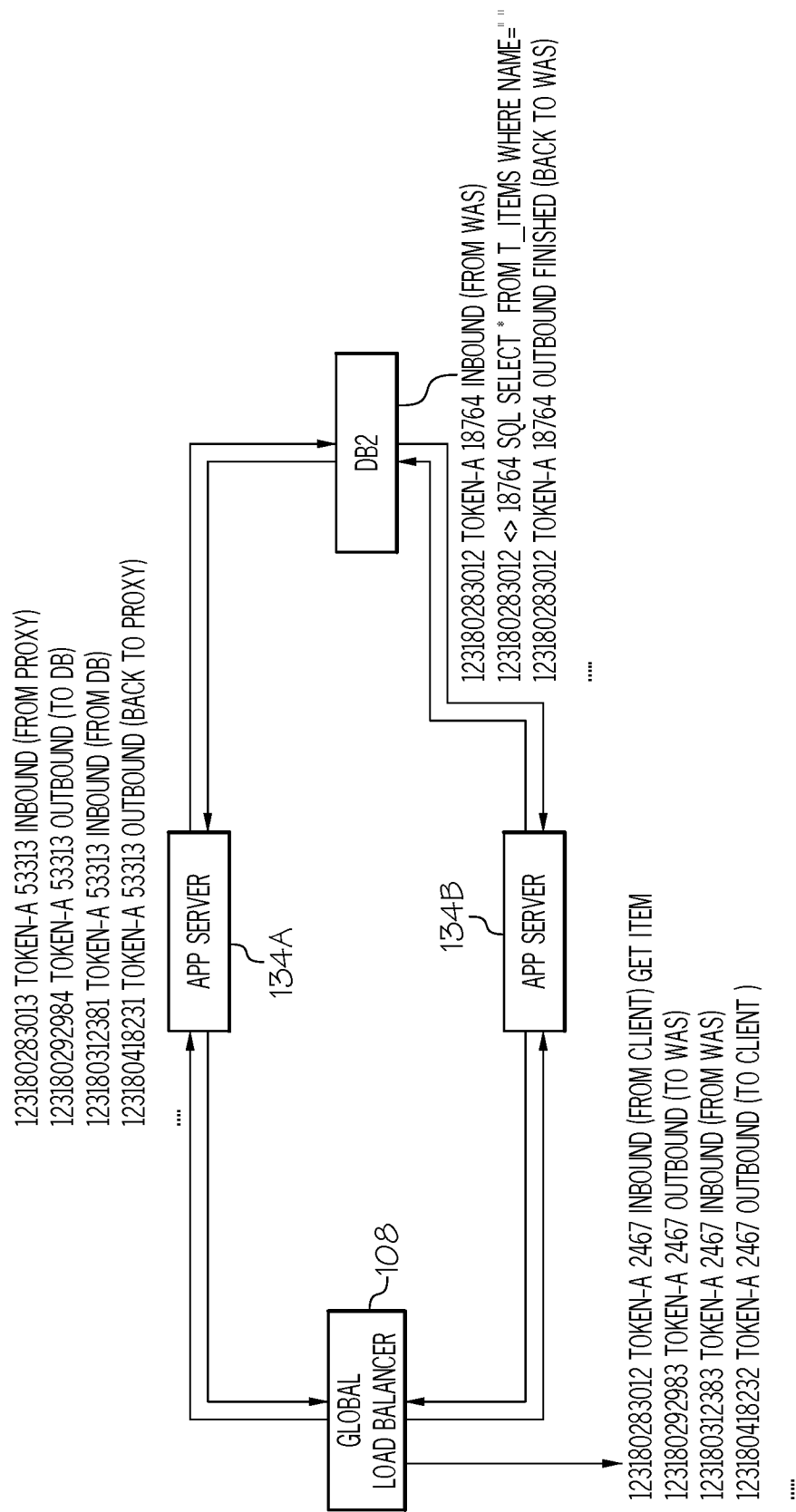
FIG. 4 is a diagram illustrating one example of a more detailed instrumentation of requests to data resources of FIG. 3.
Figure 6:
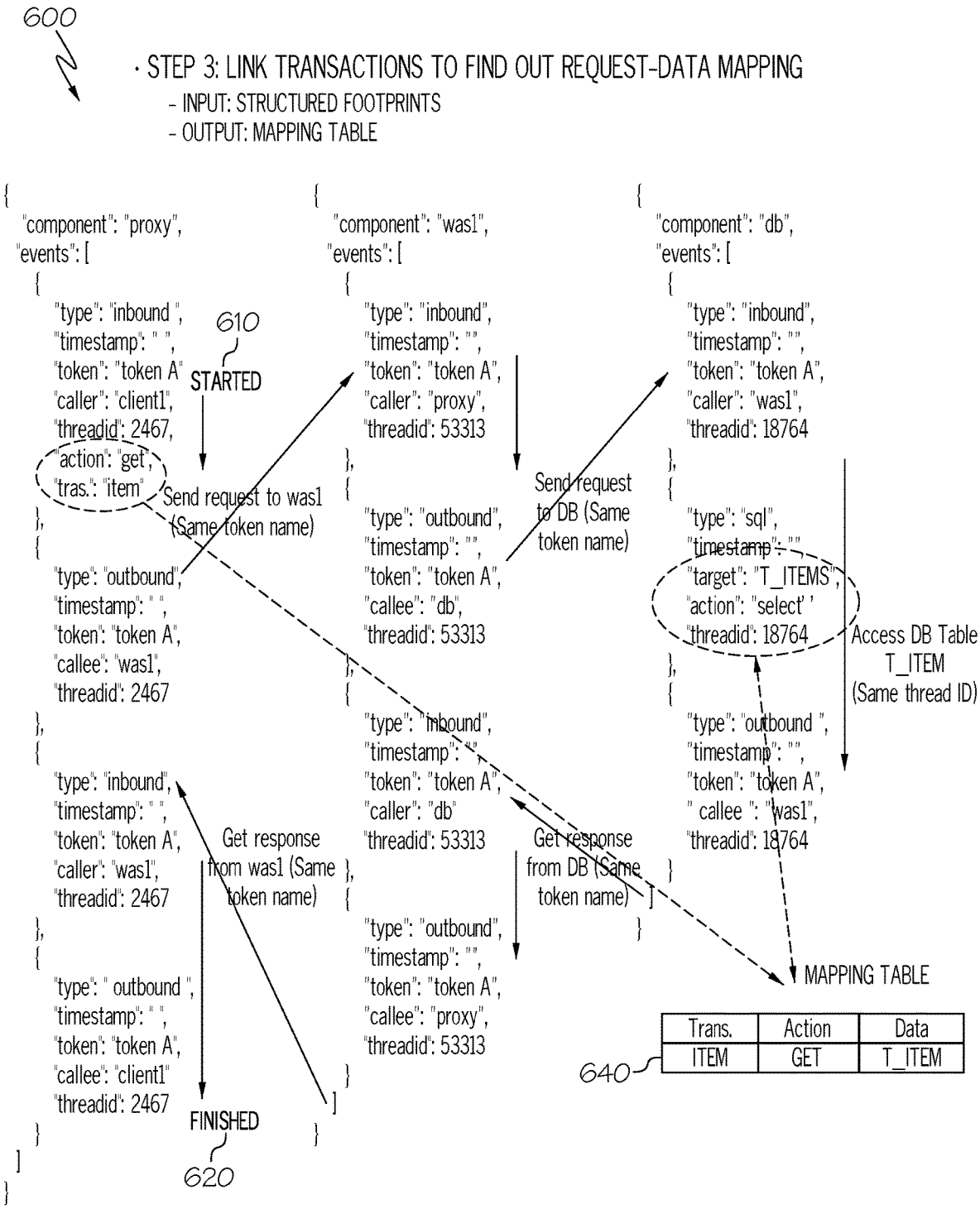
FIG. 6 is a diagram illustrating the linking of transaction to create request-data mappings for a mapping table.

Turning to FIG. 5 is a diagram 500 illustrating the detailed instrumentation of FIG. 4 being put into a structure to permit analysis. Shown in FIG. 6 is a diagram 600 illustrating the linking of transaction to create request-data mappings for a mapping table 640. In this example the starting HTTP method 610 and ending HTTP method 620 are linked to create the entries in mapping table 640 as shown.

Figure 7:
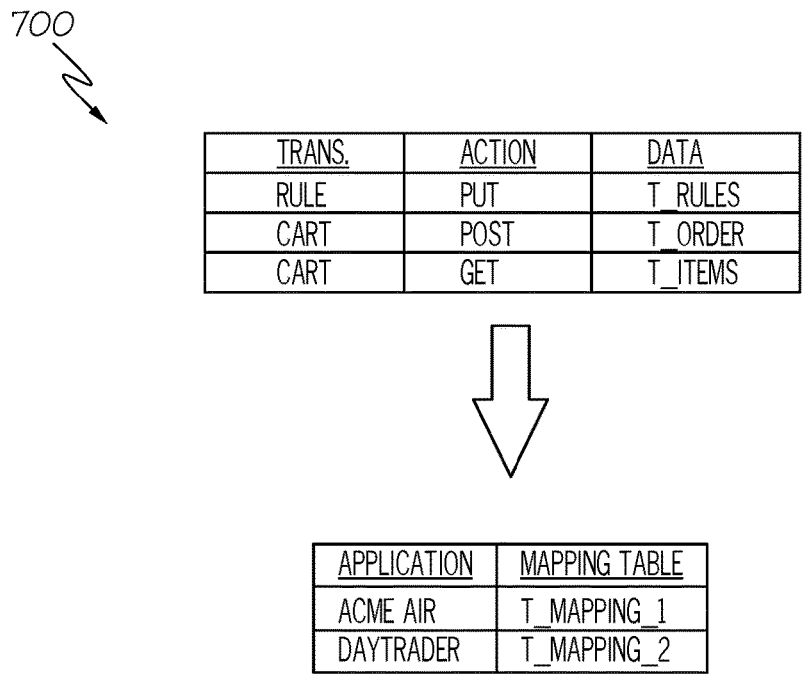
FIG. 7 is a diagram illustrating the example mappings for components of each application.
Figure 8:
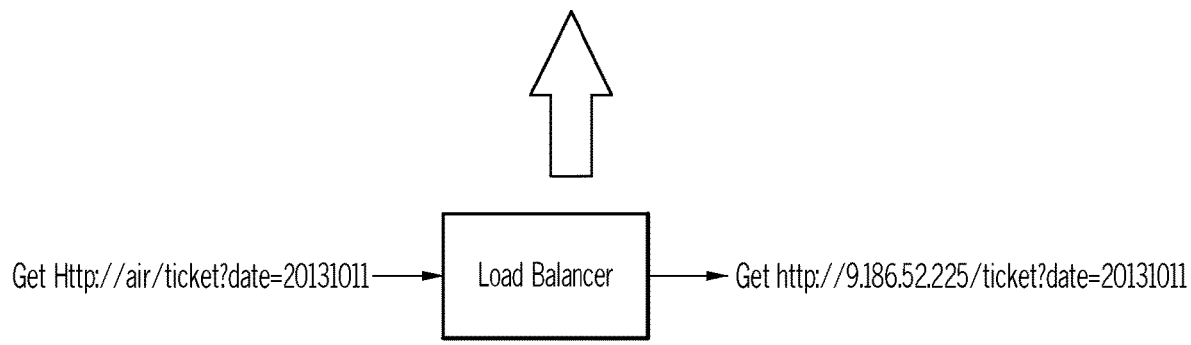
FIG. 8 is a diagram illustrating the triggering of bursting to a second cloud based on the mapping table for the application in FIG. 7.

FIG. 7 is a diagram 700 illustrating the example mappings for components of each application. This is typically then made accessible to the cloud-bursting manager 208 of FIG. 2 to allow each application to be managed via its own mapping table. FIG. 8 is a diagram 800 illustrating the triggering of bursting to a second cloud based on the mapping table for the application in FIG. 7. FIG. 8 is a diagram 800 illustrating the triggering of bursting to a second cloud based on the mapping table for the application in FIG. 7. The first four columns of diagram 800 i.e. TRANS, ACTION, DENSITY, RESPONSE TIME are coming from global load balancer 108. The cloud bursting controller 208 uses such information and predefined weight to decide which software application or portion of the software application needs to be migrated at the moment.

Figure 9:
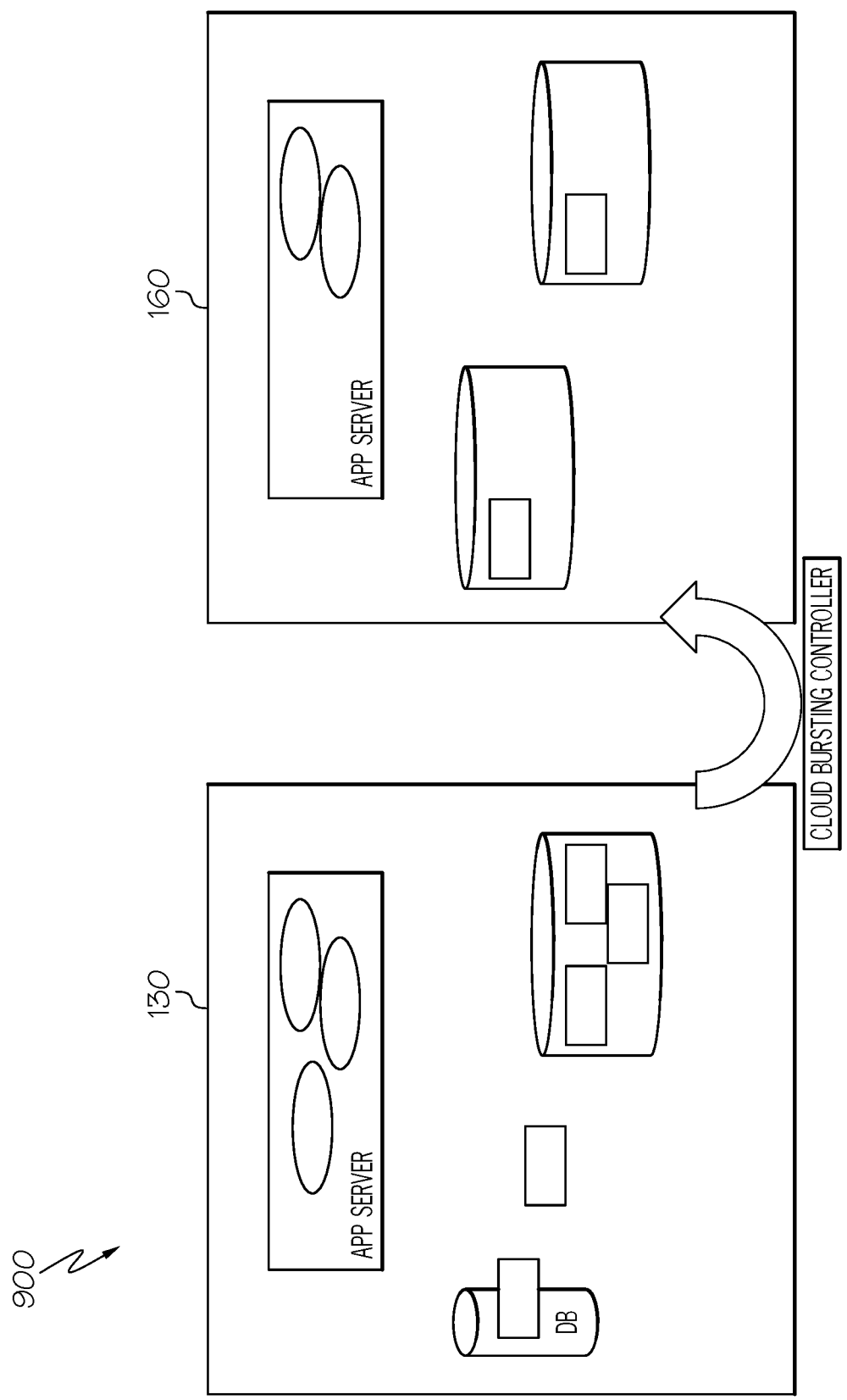
FIG. 9 is a diagram illustrating the application components and corresponding database tables being moved from a first deployment model of a computing infrastructure to a second deployment model of a computing infrastructure in response to the triggering in FIG. 8.
Figure 10:
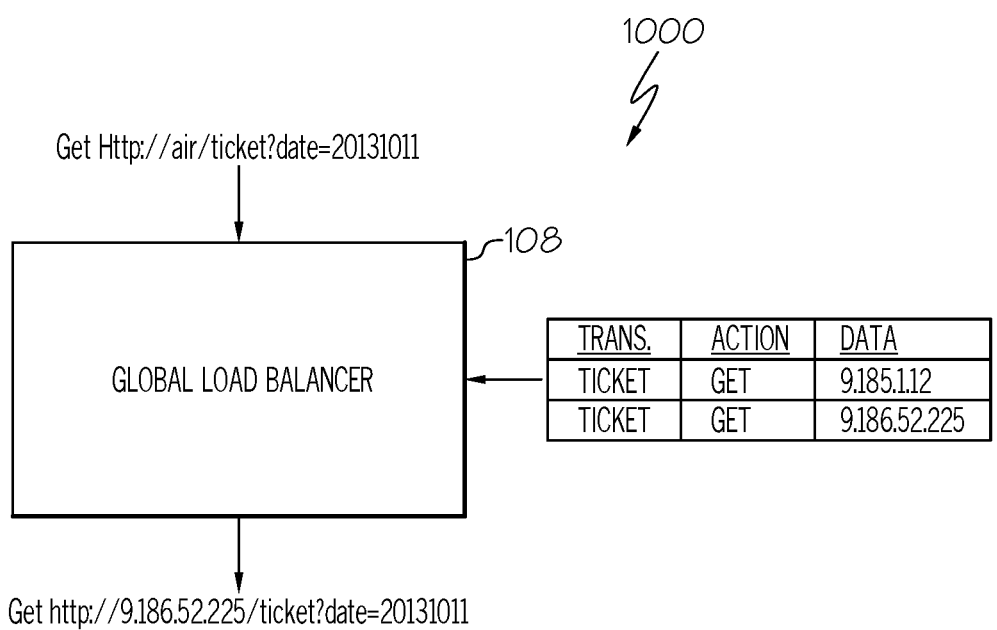
FIG. 10 is a diagram illustrating a load balancer configuration being updated to redirect new transaction requests to the processing node in the second deployment model of the computing infrastructure after the bursting in FIG. 9.

FIG. 9 is a diagram 900 illustrating the application components and corresponding database tables being moved from a first deployment model of a computing infrastructure 130 to a second deployment model of a computing infrastructure in response to the triggering in FIG. 8. FIG. 10 is a diagram 1000 illustrating a load balancer configuration being updated to redirect new transaction requests to the processing node in the second deployment model of the computing infrastructure after the bursting in FIG. 9.

Generalized Flow

Figure 11:
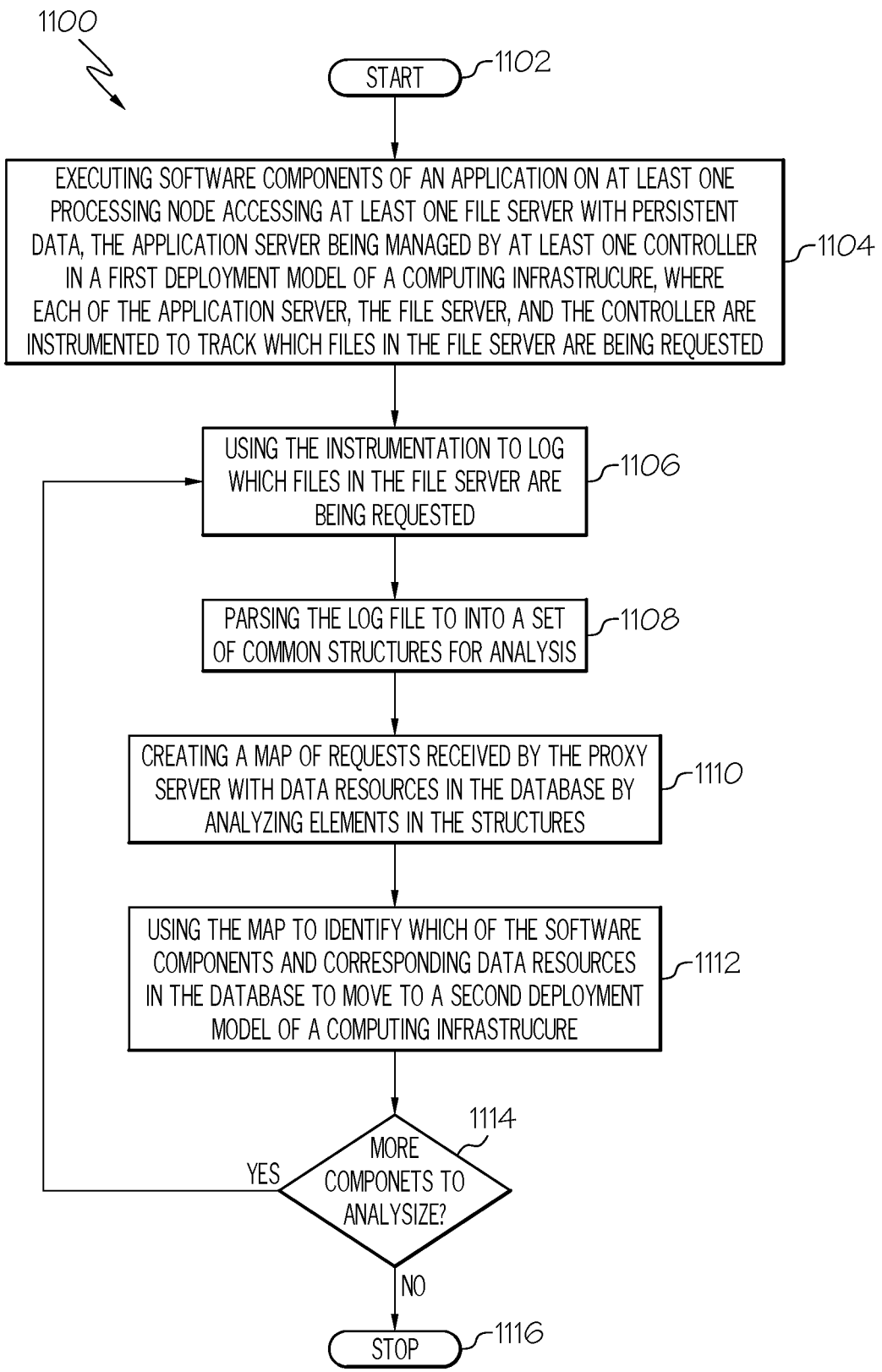
FIG. 11 is a flow diagram of managing the allocation of software components between a first deployment model and a second deployment model.

FIG. 11 is a flow diagram of managing the allocation of software components between a first deployment model and a second deployment model. The process begins at step 1102 and immediately proceeds to step 1104. In step 1104, as described for FIG. 2-4 above. Software components of an application 134 are executing on at least one application server 134(A), 134(B). The application server is accessing at least one file server with persistent data or database server 136. A controller/manager server 108, 208 is managing the application server in a first deployment model of a computing infrastructure. Each of the application servers 134(A), 134(B), the database server 136, and the controller/manager server 108, 208 are instrumented to track which files in the file server are being requested; In step 1106, using the

| TIMESTAMP | TOKEN NAME | THREAD ID | USERID | METHOD NAME | TABLE NAME | TYPE [Source/Destination] |
|---|---|---|---|---|---|---|
| 10:52:31 | 10:52:31 | 01 | 0100981 | INSERT | T_USER | Inbound (from global load balancer) |
| 10:52:67 | 10:52:67 | 06 | 0100111 | DELETED | T_ITEMS | Inbound (from global load balancer) |
| 10:52:02 | 10:52:02 | 01 | 0100743 | SELECT | T_USER | Outbound (from database) |

In this example token includes timestamp of the method, a unique name for the token, a thread id corresponding to the method being executed by the application on processing node 134, a customer/user id, the name of the HTTP method, instrumentation to log which files in the file server are being requested. The transaction requests tracked by the instrumentation are parsed into a set of common structures for analysis.

Next in step 1106, the instrumentation is used to log the transaction requests and optionally other performance metrics as shown in FIG. 3 and FIG. 4. The transaction requests, in step 1108 are parsed into a set of common structures for analysis as shown in FIG. 5. Further, as shown in FIG. 6, in step 1110 creating a map 640, and FIG. 7 of transaction requests received by the controller/manager server to data resources in the database by analyzing the set of common structures in step 1108. The map is used to identify which of the software components and corresponding data resources in the database to move a processing node in a second deployment model of a computing infrastructure, in step 1112.

In step 1114, a test is made to determine if more components of the software need to be analyzed. If more components need to be analyzed, the process returns to step 1106. Otherwise, the process stops in step 1116.

Generalized Cloud Computing Environment

It should be understood that although the following includes a detailed discussion on cloud computing, implementation of the teachings recited herein are not limited to a cloud computing environment. Rather, embodiments of the present disclosure are capable of being implemented in conjunction with any other type of computing environment now known or later developed, including client-server and peer-to-peer computing environments. For example, various embodiments of the present disclosure are applicable to any computing environment with a virtualized infrastructure or any other type of computing environment.

For convenience, this discussion includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present disclosure are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

With on-demand self-service a cloud consumer can unilaterally provision computing capabilities, such as server time and network storage, as needed automatically without requiring human interaction with a service provider. With broad network access capabilities are available over a network and accessed through standard mechanisms that promote use by heterogeneous thin or thick client platforms (e.g., mobile phones, laptops, and personal digital assistants (PDAs)). With resource pooling computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

With rapid elasticity capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. With measured service cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In a SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure comprising a network of interconnected nodes.

Figure 12:
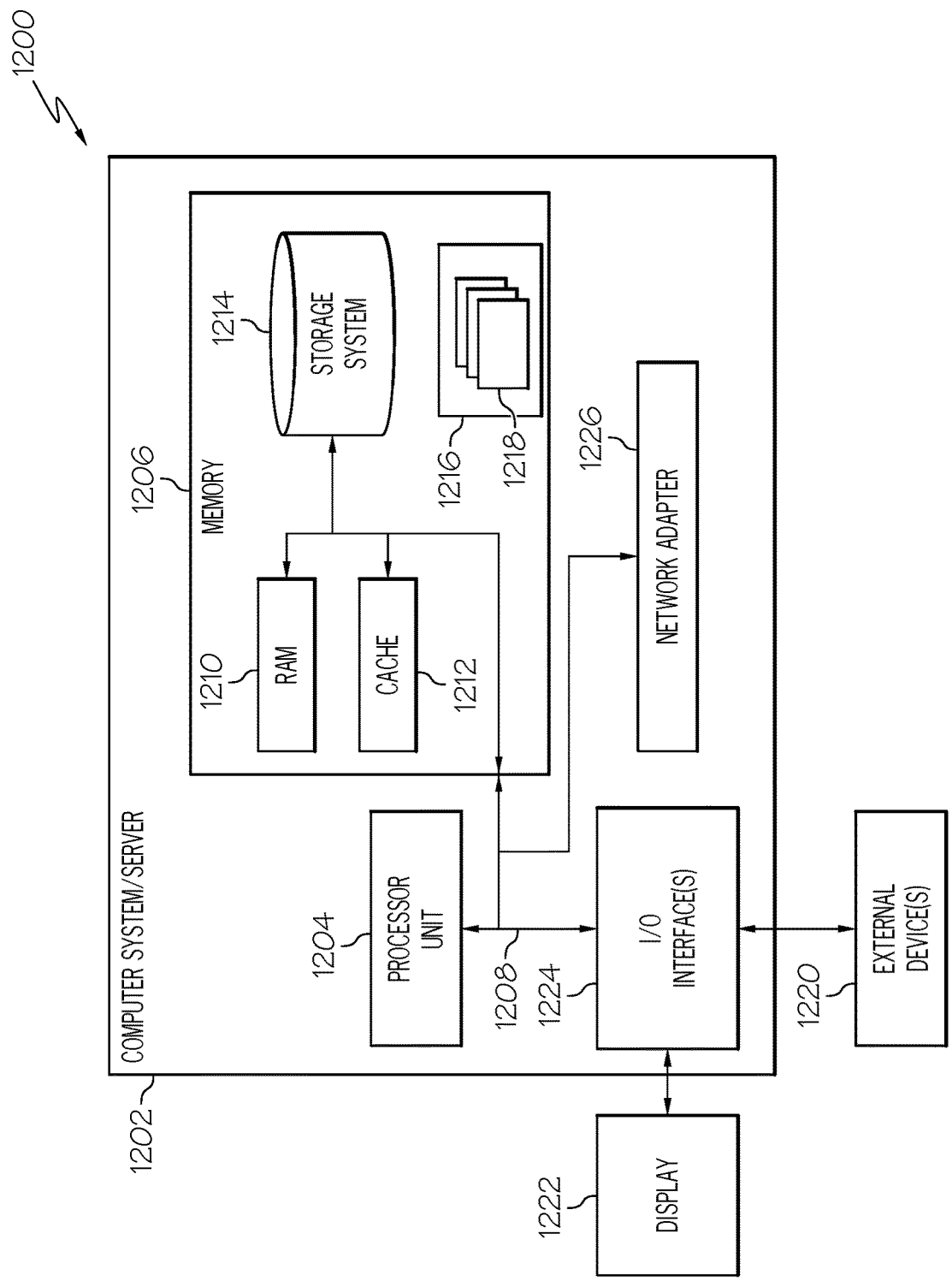
FIG. 12 illustrates one example of a processing node.

Referring now to FIG. 12, a schematic of an example of a cloud computing node is shown. Cloud computing node 1200 is only one example of a suitable cloud computing node and is not intended to suggest any limitation as to the scope of use or functionality of embodiments of the invention described herein. Regardless, cloud computing node 1200 is capable of being implemented and/or performing any of the functionality set forth hereinabove. The term processing node is a logical concept. Any number of central processing units with any number of cores or machines can be in a single processing node.

In cloud computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1202 in cloud computing node 1200 is shown in the form of a general-purpose computing device. The components of computer system/server 1202 may include, but are not limited to, one or more processors or processing units 1204, a system memory 1206, and a bus 1208 that couples various system components including system memory 1206 to processor 1204.

Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1002, and it includes both volatile and non-volatile media, removable and non-removable media.

System memory 1206, in one embodiment, comprises the instrumentation data show in in FIG. 4, FIG. 5, and FIG. 6. The system memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of various embodiments of the invention.

Program/utility 1216, having a set (at least one) of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of various embodiments of the invention as described herein.

Computer system/server 1202 may also communicate with one or more external devices 1020 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks such as a local area network (LAN), a general wide area network (WAN), and/or a public network (e.g., the Internet) via network adapter 1226. As depicted, network adapter 1226 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

Figure 13:
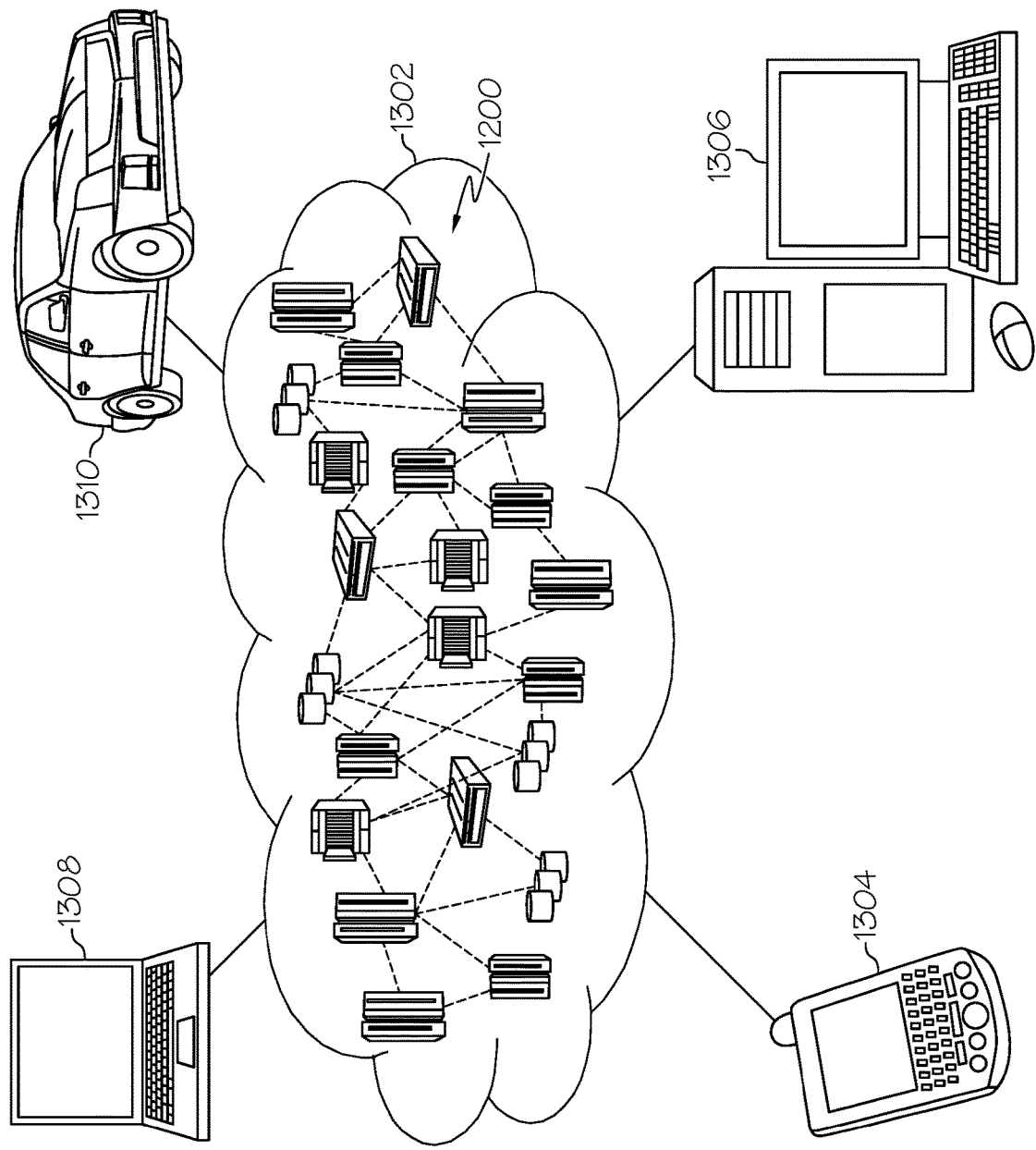
FIG. 13 illustrates one example of a cloud computing environment.

Referring now to FIG. 13, illustrative cloud computing environment 1302 is depicted. As shown, cloud computing environment 1302 comprises one or more cloud computing nodes 1200 with which local computing devices used by cloud consumers, such as, for example, personal digital assistant (PDA) or cellular telephone 1304, desktop computer 1306, laptop computer 1308, and/or automobile computer system 1310 may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1302 to offer infrastructure, platforms and/or software as services for which a cloud consumer does not need to maintain resources on a local computing device. It is understood that the types of computing devices 1304, 1306, 1308, 1310 shown in FIG. 13 are intended to be illustrative only and that computing nodes 1200 and cloud computing environment 1302 can communicate with any type of computerized device over any type of network and/or network addressable connection (e.g., using a web browser).

Figure 14:
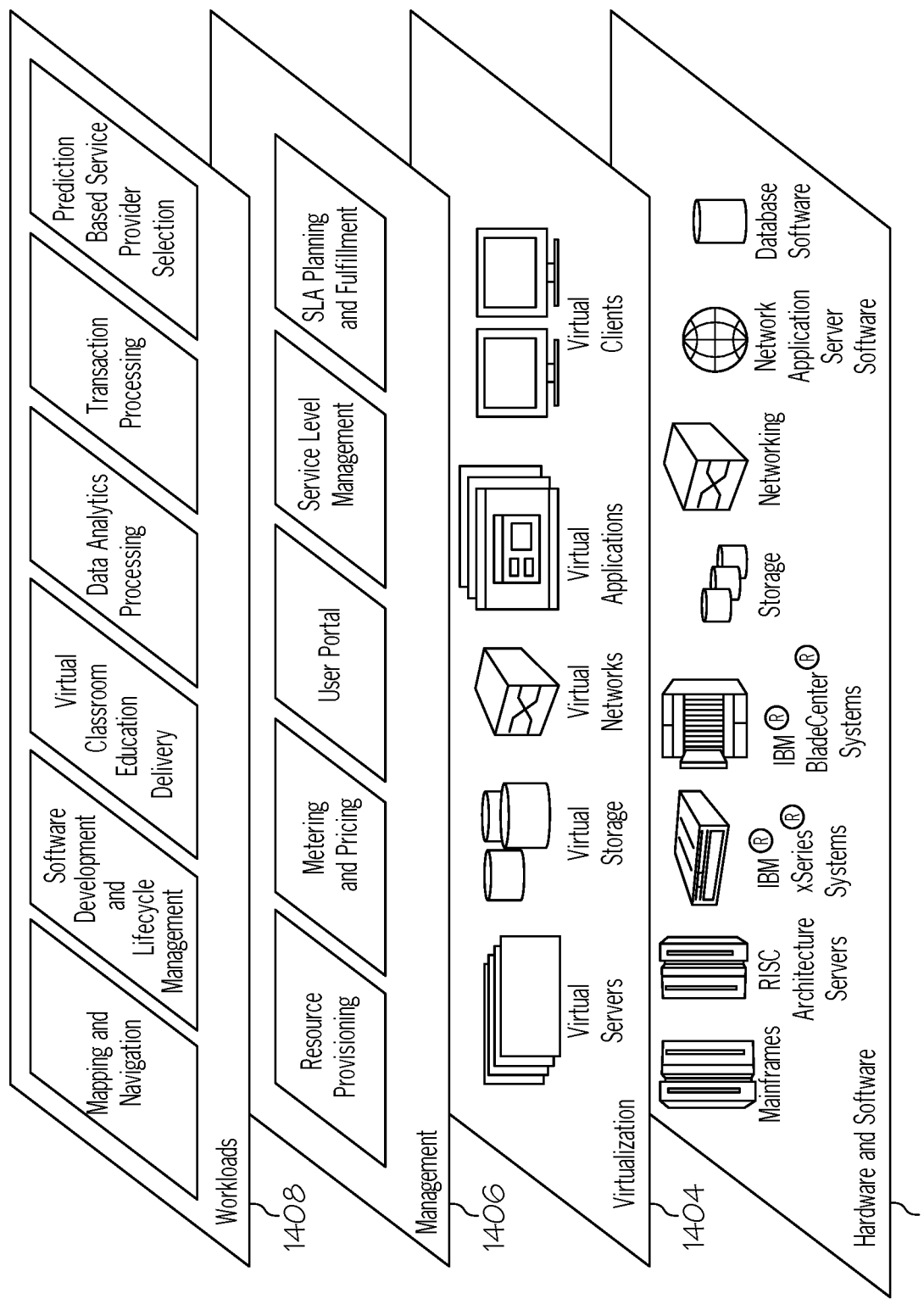
FIG. 14 illustrates abstraction model layer.

Referring now to FIG. 14, a set of functional abstraction layers provided by cloud computing environment 1302 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1402 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1404 provides an abstraction layer from which the following examples of virtual entities may be provided: virtual servers; virtual storage; virtual networks, including virtual private networks; virtual applications and operating systems; and virtual clients.

In one example, management layer 1406 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1408 provides examples of functionality for which the cloud computing environment may be utilized. Examples of workloads and functions which may be provided from this layer include: mapping and navigation; software development and lifecycle management; virtual classroom education delivery; data analytics processing; transaction processing; and prediction-based service provider selection.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for on-demand workload management between a first deployment model of a computing infrastructure and a second deployment model of a computing infrastructure, the method comprising:
   executing one or more software components of at least one application receiving transaction requests on a first processing node accessing at least one file server with persistent data in at least one database, wherein the transaction requests are tracked using tokens and each of the tokens include a thread identifier for a thread handling each of the transaction requests, the first processing node is managed by at least one controller in a first deployment model of a computing infrastructure;
   performing enhanced transaction tracing analytics through use of instrumentation of the first processing node and the file server-for tracking which files in which table in which database in the first processing node in the file server are being requested;
   parsing the transaction requests tracked by the instrumentation into a set of common structures for analysis;
   creating a transaction-data map of transaction requests received by the controller to data resources in the file server by analyzing the set of common structures; and
   using the transaction-data map to identify which of the one or more software components and corresponding data resources in the file server to move over to a second processing node in a second deployment model of a computing infrastructure.

2. The computer-based method of claim 1, wherein the file server is at least one database server, each of the tokens include
   a user identifier of a user.

3. The computer-based method of claim 1, where in the first deployment model of a computing infrastructure is a private cloud, and
   wherein the transaction-data map includes a timestamp, a method name, a table name in the at least one database, an inbound/outbound type with a source identifier,
   wherein the using the transaction-data map to identify which of the one or more software components and corresponding data resources in the file server to move over to a second processing node in a second deployment model of a computing infrastructure includes using information from a load balancer and predefined weights assigned to the one or more software components.

4. The computer-based method of claim 3, wherein the creating the transaction-data map includes creating the transaction-data map with a frequency of the inbound/outbound type with a source identifier during a time period, and a response time to fulfill the inbound/outbound type with a source identifier of transaction.

5. The computer-based method of claim 4, wherein the creating the transaction-data map further includes creating the transaction-data map a settable weighting factor associated with each of the inbound/outbound type with a source identifier for each of the transaction requests.

6. The computer-based method of claim 5, wherein using the transaction-data map includes identifying software components with lower frequency of the inbound/outbound type with a source identifier of each of the transaction requests during the time period.

7. A system for managing allocation of software components between a first deployment model of a computing infrastructure and a second deployment model of a computing infrastructure, the system comprising:
   a memory;
   a processor communicatively coupled to the memory, where the processor is configured to perform
   executing one or more software components of at least one application receiving transaction requests on a first processing node accessing at least one file server with persistent data in at least one database, wherein the transaction requests are tracked using tokens and each of the tokens include a thread identifier for a thread handling each of the transaction requests, the first processing node is managed by at least one controller in a first deployment model of a computing infrastructure
   performing enhanced transaction tracing analytics through use of instrumentation of the first processing node and the file server for tracking which files in which table in which database in the first processing node in the file server are being requested;

parsing the transaction requests tracked by the instrumentation into a set of common structures for analysis;

creating a transaction-data map of transaction requests received by the controller to data resources in the file server by analyzing the set of common structures; and using the transaction-data map with information from a load balancer and predefined weights assigned to the one or more software components to identify which of the one or more software components and corresponding data resources in the file server to move over to a second processing node in a second deployment model of a computing infrastructure.

8. The system of claim 7, wherein the file server is at least one database server, each of the tokens include
a user identifier of a user.

9. The system of claim 7, where in the first deployment model of a computing infrastructure is a private cloud, and
wherein the transaction-data map includes a timestamp, a method name, a table name in the at least one database, an inbound/outbound type with a source identifier,
wherein the using the transaction-data map to identify which of the one or more software components and corresponding data resources in the file server to move over to a second processing node in a second deployment model of a computing infrastructure includes using information from a load balancer and predefined weights assigned to the one or more software components.

10. The system of claim 9, the creating the transaction-data map includes creating the transaction-data map with a frequency of the inbound/outbound type with a source identifier during a time period, and a response time to fulfill the inbound/outbound type with a source identifier of transaction.

11. The system of claim 10, wherein the creating the transaction-data map further includes creating the transaction-data map a settable weighting factor associated with each of the inbound/outbound type with a source identifier for each of the transaction requests.

12. The system of claim 11, wherein using the transaction-data map includes identifying software components with lower frequency of the inbound/outbound type with a source identifier of transaction request during the time period.

13. A non-transitory computer program product for managing allocation of software components between a first deployment model of a computing infrastructure and a second deployment model of a computing infrastructure, the non-transitory computer program product comprising a computer readable storage medium having computer readable program code embodied therewith, the computer readable program code configured to perform:

executing one or more software components of at least one application receiving transaction requests on a first processing node accessing at least one file server with persistent data in at least one database, wherein the transaction requests are tracked using tokens and each of the tokens include a thread identifier for a thread handling each of the transaction requests, the first processing node is managed by at least one controller in a first deployment model of a computing infrastructure;

performing enhanced transaction tracing analytics through use of instrumentation of the first processing node and the file server for tracking which files in which table in which database in the first processing node in the file server are being requested;

parsing the transaction requests tracked by the instrumentation into a set of common structures for analysis;

creating a transaction-data map of transaction requests received by the controller to data resources in the file server by analyzing the set of common structures; and using the transaction-data map to identify which of the one or more software components and corresponding data resources in the file server to move over to a second processing node in a second deployment model of a computing infrastructure.

14. The non-transitory computer program product of claim 13, wherein the file server is at least one database server, each of the tokens include
a user identifier of a user.

15. The non-transitory computer program product of claim 13, where in the first deployment model of a computing infrastructure is a private cloud, and
wherein the transaction-data map includes a timestamp, a method name, a table name in the at least one database, an inbound/outbound type with a source identifier,
wherein the using the transaction-data map to identify which of the one or more software components and corresponding data resources in the file server to move over to a second processing node in a second deployment model of a computing infrastructure includes using information from a load balancer and predefined weights assigned to the one or more software components.

16. The non-transitory computer program product of claim 15, wherein each of the tokens include
a timestamp of each of the transaction requests and a name of at least one database table in the database server.

17. The computer-based method of claim 2, wherein each of the tokens include
a timestamp of each of the transaction requests.

18. The computer-based method of claim 17, wherein each of the tokens include
a name of at least one database table in the database server.

19. The system of claim 7, wherein each of the tokens include
a timestamp of each of the transaction requests.

20. The system of claim 19, wherein each of the tokens include
a name of at least one database table in the database server.

* * * * *